US012789264B2

(12) United States Patent
Haimer

(10) Patent No.: US 12,789,264 B2
(45) Date of Patent: Nov. 10, 2026

(54) MACHINE TOOL COMPONENT AND METHOD FOR PRODUCING THE MACHINE TOOL COMPONENT

(71) Applicant: Haimer GmbH, Igenhausen (DE)

(72) Inventor: Franz Haimer, Igenhausen (DE)

(73) Assignee: Haimer GmbH, Igenhausen (DE)

( * ) Notice: Subject to any disclaimer, the term of this patent is extended or adjusted under 35 U.S.C. 154(b) by 1136 days.

(21) Appl. No.: 17/731,277

(22) Filed: Apr. 28, 2022

(65) Prior Publication Data

US 2022/0347763 A1 Nov. 3, 2022

(30) Foreign Application Priority Data

Apr. 30, 2021 (DE) ..................... 10 2021 111 186.2

(51) Int. Cl.
*B23B 31/02* (2006.01)
*B22D 25/00* (2006.01)
(Continued)

(52) U.S. Cl.
CPC .............. *B23B 31/02* (2013.01); *B22D 25/00* (2013.01); *B22F 3/225* (2013.01); *B22F 10/20* (2021.01);
(Continued)

(58) Field of Classification Search
CPC ......... B23P 13/00; B23B 31/02; B23B 31/00; B23B 2222/56; B23B 2228/00; B22D 25/00; B22F 3/225; B22F 10/20; B22F 10/38; B22F 10/25; B22F 1/08; C22C 1/0458; C22C 1/11; C22C 45/00; C22C 45/001; C22C 45/02; C22C 45/10; C22C 45/008; C22C 16/00; C22C 9/00; C22C 9/01; C22C 9/06; C22C 14/00; C22C 2200/02; B33Y 80/00; B32B 5/00; B32B 15/00; B32B 15/01; B32B 15/04; B32B 15/18; B32B 15/20; Y10T 428/12; Y10T 428/12493; Y10T 428/12771; Y10T 428/12806; Y10T 428/12812; Y10T 428/12819; Y10T 428/12861; Y10T 428/12868; Y10T 428/12882; Y10T 428/12903; Y10T 428/1291; Y10T 428/12931; Y10T 428/12951; Y10T 428/12958
See application file for complete search history.

(56) References Cited

U.S. PATENT DOCUMENTS

| | | | |
|---|---|---|---|
| 9,707,650 | B2 | 7/2017 | Tiefenbock |
| 11,384,417 | B2 | 7/2022 | Kuball et al. |

(Continued)

FOREIGN PATENT DOCUMENTS

| | | |
|---|---|---|
| DE | 102008001175 | 10/2009 |
| DE | 102013110728 A1 | 4/2015 |

(Continued)

*Primary Examiner* — Michael E. La Villa
(74) *Attorney, Agent, or Firm* — Laurence A. Greenberg; Werner H. Stemer; Ralph E. Locher

(57) ABSTRACT

In order to improve a usage of machine tool components, it is provided that the machine tool component is formed at least partially, in particular essentially, or alternatively completely from an amorphous metal. It is provided that the tool component is produced using injection molding or 3D printing or plastic deformation.

17 Claims, 1 Drawing Sheet

(51) Int. Cl.

| | |
|---|---|
| ***B22F 3/22*** | (2006.01) |
| ***B22F 10/20*** | (2021.01) |
| ***B22F 10/38*** | (2021.01) |
| ***B23B 31/00*** | (2006.01) |
| ***B23P 13/00*** | (2006.01) |
| ***B32B 5/00*** | (2006.01) |
| ***B32B 15/00*** | (2006.01) |
| ***B32B 15/01*** | (2006.01) |
| ***B32B 15/04*** | (2006.01) |
| ***B32B 15/18*** | (2006.01) |
| ***B32B 15/20*** | (2006.01) |
| ***C22C 1/11*** | (2023.01) |
| ***C22C 9/00*** | (2006.01) |
| ***C22C 9/01*** | (2006.01) |
| ***C22C 9/06*** | (2006.01) |
| ***C22C 14/00*** | (2006.01) |
| ***C22C 16/00*** | (2006.01) |
| ***C22C 45/00*** | (2023.01) |
| ***C22C 45/02*** | (2006.01) |
| ***C22C 45/10*** | (2006.01) |
| *B22F 1/08* | (2022.01) |
| *B22F 10/25* | (2021.01) |
| *B33Y 80/00* | (2015.01) |

(52) U.S. Cl.

CPC .............. *B22F 10/38* (2021.01); *B23B 31/00* (2013.01); *B23P 13/00* (2013.01); *B32B 5/00* (2013.01); *B32B 15/00* (2013.01); *B32B 15/01* (2013.01); *B32B 15/04* (2013.01); *B32B 15/18* (2013.01); *B32B 15/20* (2013.01); *C22C 1/11* (2023.01); *C22C 9/00* (2013.01); *C22C 9/01* (2013.01); *C22C 9/06* (2013.01); *C22C 14/00* (2013.01); *C22C 16/00* (2013.01); *C22C 45/00* (2013.01); *C22C 45/001* (2013.01); *C22C 45/008* (2013.01); *C22C 45/02* (2013.01); *C22C 45/10* (2013.01); *B22F 1/08* (2022.01); *B22F 10/25* (2021.01); *B23B 2222/56* (2013.01); *B23B 2228/00* (2013.01); *B33Y 80/00* (2014.12); *C22C 2200/02* (2013.01); *Y10T 428/12* (2015.01); *Y10T 428/12493* (2015.01); *Y10T 428/12771* (2015.01); *Y10T 428/12806* (2015.01); *Y10T 428/12812* (2015.01); *Y10T 428/12819* (2015.01); *Y10T 428/12861* (2015.01); *Y10T 428/12868* (2015.01); *Y10T 428/12882* (2015.01); *Y10T 428/12903* (2015.01); *Y10T 428/1291* (2015.01); *Y10T 428/12931* (2015.01); *Y10T 428/12951* (2015.01); *Y10T 428/12958* (2015.01)

(56) References Cited

U.S. PATENT DOCUMENTS

| | | | | |
|---|---|---|---|---|
| 2007/0184406 | A1* | 8/2007 | Mason ..................... | A61C 5/42 433/102 |
| 2010/0178522 | A1* | 7/2010 | Mosimann ......... | A61B 17/1624 428/457 |
| 2013/0052612 | A1* | 2/2013 | Smailus ................... | A61C 3/06 433/142 |
| 2017/0151609 | A1* | 6/2017 | Elsen ...................... | C22F 1/002 |
| 2019/0202013 | A1* | 7/2019 | Wawro ...................... | B25B 5/00 |

FOREIGN PATENT DOCUMENTS

| | | | |
|---|---|---|---|
| DE | 202018003475 | U1 | 10/2019 |
| EP | 3447158 | A1 | 2/2019 |

* cited by examiner

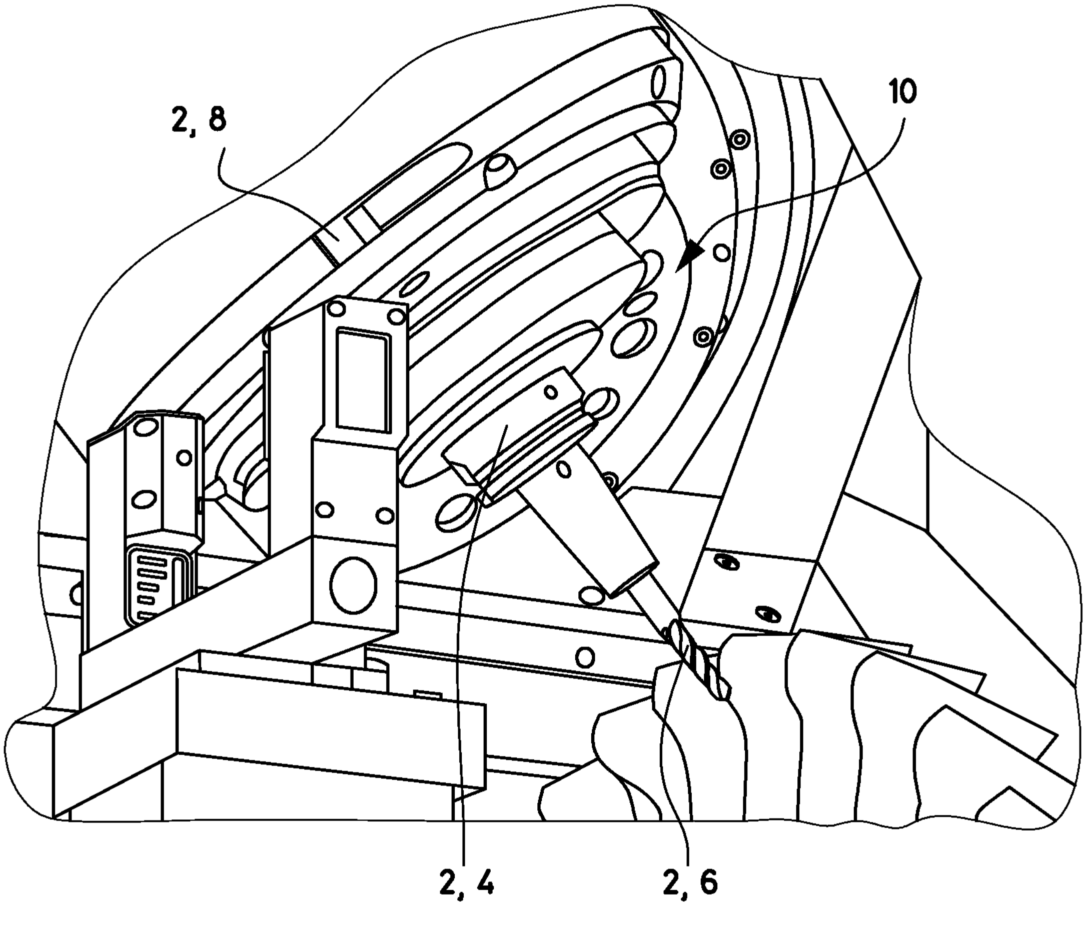
2, 8
10
2, 4
2, 6

MACHINE TOOL COMPONENT AND METHOD FOR PRODUCING THE MACHINE TOOL COMPONENT

CROSS-REFERENCE TO RELATED APPLICATION

This application claims the priority, under 35 U.S.C. § 119, of German Patent Application DE 10 2021 111 186.2, filed Apr. 30, 2021; the prior application is herewith incorporated by reference in its entirety.

FIELD AND BACKGROUND OF THE INVENTION

As is known, machine tools are machines for manufacturing workpieces by means of (power-operated) tools, the movement of which relative to one another is predetermined by the machine. The most important examples of such machine tools here include turning and milling machines with the appropriate (power-operated) tools such as turning tools and milling tools.

Such machine tools have numerous components, the best known, in particular of such known turning and milling machines, being spindles, tool holders, and the (power-operated) tools, wherein they are all, also via standard interfaces, connected to one another in the movement chain of the machine tool or the turning/milling machine.

The tool holder, which is intended to ensure rapid tool replacement for the machine tool and at the same time a high degree of (positional) accuracy, is here an apparatus, usually configured as a clamping device, for holding and retaining the (power-operated) tool (simply "tool" for short below). Tool holders should usually have a high degree of stiffness, good surface accuracy, high corrosion resistance, and high hardness with at the same time high toughness, which can be achieved by the use of a corresponding material such as hard metals.

The spindle, to be more precise the working spindle which carries the tool, of the machine tool is usually driven by a motor of the machine tool and is, expressed in a simplified and illustrative way, a shaft with an integrated tool interface. The shaft must here be stiff enough that it bends as little as possible as a result of radial forces. The stiffness depends, inter alia, on the diameter, material, and length of the shaft. However, a larger, and usually stiffer, diameter in turn results in a higher moment of inertia, which increases the amount of energy expended for the acceleration. In addition, dynamic behavior of the shaft plays an important role. The rotating shaft represents, together with the drive and bearing, a vibratory system which can become unstable when it reaches its critical speed.

The tool, for example the milling tool, or just cutter for short, the turning tool, such as a (turning) chisel, or alternatively a drill is, expressed illustratively, the "last output-side" component of the machine tool, which then shapes a workpiece to be machined. Tools should usually have high resistance to wear, high corrosion resistance, and high hardness with at the same time high toughness, which can be achieved by the use of a corresponding material such as hard metals and/or by suitable heat treatment.

In general, in order to fulfil their respective purposes/tasks, numerous properties, some of which also conflict with each other, are demanded of machine tool components, such as the abovementioned hardness, wear, and toughness. A corresponding targeted and task-oriented selection of materials and the corresponding targeted and task-oriented processing method is vitally important for machine tool components.

SUMMARY OF THE INVENTION

The object of the invention is to improve the machine tool components known in the prior art.

This object is achieved by a machine tool component and a method for producing a machine tool component having the features of the respective independent claim.

Advantageous developments of the invention are the subject of dependent claims and the following description and relate to both the tool component and the method.

Terms which may be used such as upper, lower, front, rear, left, or right are, where not explicitly defined otherwise, to be understood in the usual sense. Terms such as radial and axial are, where used and not explicitly defined otherwise, to be understood with reference to a center axis of the machine tool component.

The term "essentially", where used, can be understood (according to the interpretation of the supreme court) as meaning "to a substantial degree in practice". Possible deviations from precise information which are thus implied by this terminology can thus occur unintentionally (i.e. for no functional reason) because of manufacturing or assembly tolerances or the like.

The machine tool component is characterized in that it consists at least partially, in particular essentially or alternatively completely, of an amorphous metal (also referred to below for short simply as just "amorphous machine tool component").

Nonetheless, "(material) combined" machine tool components can also be provided which thus provides, for example, an "amorphous" (machine tool component) base body with "non-amorphous" "add-ons" or cores, for example "amorphously coated" cores, or vice versa, and/or "non-amorphous" coatings for the machine tool component.

Such non-amorphous (machine tool component) parts can be metallic or alternatively non-metallic, for example made from plastic.

Amorphous metals, also referred to as metallic glasses, are metal or metal/non-metal alloys which have an amorphous rather than crystalline structure at the atomic level and nevertheless display metallic conductivity. This means that the atoms in amorphous metals do not form an (ordered) lattice and instead are arranged randomly at first sight. In short, there is no distant configuration and instead at most a near configuration.

Amorphous metals or metallic glasses are created by the formation of an (ordered) lattice structure or a natural crystallization being prevented at the phase transition from liquid to solid. This can happen, for example, by developing specific alloy compositions such as zirconium-, copper-, iron-, and/or titanium-based alloys and/or by sudden cooling ("quenching") of molten metal such that the atoms have lost their ability to move before they can assume the crystal arrangement. Expressed in short and in simplified terms, they are frozen in their disorder and as a result develop exceptional material properties such as high strength, combined with good elasticity, high surface quality, high hardness, low abrasion, and high corrosion resistance.

Because the "freezing" of the liquid structure at the glass transition does not, in contrast to crystalline materials, cause a sudden, abrupt change in volume (solidifying contraction), there is no need to subsequently supply the molten metal and the creation of cavities, which usually entail an impairment of the mechanical properties, is prevented.

Because the glass structure also does not have, in contrast to crystalline materials, a conventional ordered microstructure, amorphous metals or metallic glasses can be deformed up to an atomic level, which provides unique options for their structuring and shaping.

In the method for producing a or such a machine tool component, at least that part of the tool component which is intended to form the at least amorphous metallic part of the tool component is subjected to injection molding or 3D printing or plastic deformation, which method prevents lattice-forming crystallization and a regular lattice state for the machine tool component or metal and thus results in a random or unordered state (injection molding, 3D printing) or maintains such a random or unordered lattice state (plastic deformation).

Combinations of the methods can also be envisaged for the method such as, for example, the or an initial injection molding followed by the or a subsequent plastic deformation.

In particular with such a subsequent plastic deformation, complex structures and/or shapes can then be generated from initially simply structured and/or simply shaped base bodies.

The combination of the method, based on a conventionally produced machine tool component, for example "adding on" (or "surrounding" (core) or coating) of the amorphous machine tool component part to (or around) a conventionally produced machine tool component base body which is, for example, cast and/or machined from a solid block, such as turned, drilled, milled, and/or ground, by means of 3D printing, such as an additively manufactured tool-side holding region (chuck region) for a tool holder, to a conventionally cast spindle-side interface (for example, HSK, inter alia) of the tool holder, can also be expedient.

It can likewise be provided that a conventionally produced machine tool component base body (core) which is, for example, cast and/or machined (from a solid block), such as turned, milled, drilled, and/or ground, is 3D-overprinted and/or "overmolded" (with the injection molding process). It can thus then represent, for example, an "amorphous coating" for the machine tool component.

It can likewise prove to be expedient if, during the 3D printing or the injection molding and/or the plastic deformation, "islands" or inclusions, which are in particular made of a different material or metal/alloy than the amorphous metal and/or are then present in the (finished) machine tool component in a different structure, in particular in an ordered lattice structure, are imprinted or injected or shaped therein. Such "islands" or inclusions can be present or be formed on the inside and/or on the surface of the machine tool component.

As a result, additional desired properties such as, for example, electrical conductivity can be generated for specific machine tool components.

Such "islands" or inclusions can also be generated by heat treatment, for example by the targeted production in some areas of a lattice structure, caused by local heating above the glass transition temperature and quenching, in particular at the surface.

Irrespective of the method, post-processing of the machine tool component produced by the method can also be carried out by means of a conventional method such as, for example, (subsequent) honing of the machine tool component.

Amorphous metals or metallic glasses can, as provided according to the method, be processed in an injection-molding, 3D printing, or plastic deformation process in order thus to produce the tool component.

In the injection-molding process, the amorphous metals or metallic glasses are thus expediently, as provided in the case of the tool component, melted and injected in a liquid state into a mold in which they solidify without the crystallization which forms the lattice structure.

The mold expediently provides cooling which makes available sufficient heat dissipation and allows the tool component to solidify without the crystallization which forms the lattice structure.

In 3D printing, also known by the terms additive manufacturing or generative manufacturing, material, in this case amorphous metal powder, is expediently, as provided in the case of the tool component, deposited in layers and thus generates three-dimensional objects (workpieces), i.e. in this case the tool component. Physical or chemical curing or melting processes take place in the accumulation of layers, wherein crystallization which forms a lattice structure can, however, be avoided for the machine tool component or the metal which constitutes it. In addition, other additive methods for producing structures of amorphous metal can also be suitable such as, for example, laser deposition welding.

In particular the 3D printing provided for the method proves to be particularly advantageous when complex structures are required for machine tool components, for example hydraulic expansion chucks, which provide complex "internal" duct systems, or shrink-fit chucks with internally situated cavities (for example for the purpose of damping vibration) or reduced-weight machine tool components with complex lightweight designs.

In plastic deformation, prefabricated parts made of amorphous material, i.e. the machine tool component, are expediently, as provided in the case of the tool component, heated above their glass transition temperature (supercooled molten metal). Above this alloy-specific temperature, the amorphous metal or the part/machine tool component softens, as in the case of processing thermoplastics in injection molding or when blowing glass to make window glass, and can then be reshaped in a targeted fashion, without material thus being removed from the prefabricated parts. The material retains its mass and its cohesion. This type of processing is unique for amorphous metals and, because they are only heated to above the glass transition temperature, requires relatively moderate temperatures (100 to 500° C.) and forces.

It has been shown that amorphous metals have high strength, combined with good elasticity, high surface quality, high hardness, low abrasion, high positional accuracy, and high corrosion resistance, and also that injection molding, 3D printing, and plastic deformation can make it possible to control the (processing of the) amorphous materials (in order thus in particular and for example to prevent the formation of (ordered) lattice states).

As described above, if numerous properties, some of which also conflict with each other, such as hardness, wear resistance, and toughness, are demanded of machine tool components in order to fulfil their respective purposes/tasks, and previously known materials may in some circumstances inadequately fulfil these demands, and a corresponding task-oriented selection of materials for tool components and the corresponding task-oriented processing method proves to be difficult for the latter, amorphous metals thus, as provided in the case of the machine tool component, with their exceptional properties, and injection molding, 3D printing, and plastic deformation of the latter, as provided in the case of the method, offer the ideal prerequisite for high-quality, long-lasting, appropriate machine tool components.

Furthermore, in the case of the “amorphous machine tool component” and/or in the case of the method, it proves in particular also to be particularly advantageous that, by virtue of the amorphous metal, the “amorphous machine tool component” and/or the method include implicit (damage) protection. Namely, if, for example owing to uncontrolled or improper overheating (above its glass transition temperature) and subsequent uncontrolled or improper cooling, the “amorphous machine tool component” loses its irregular or lattice-less structure, this entails an identifiable structural effect for the “machine tool component which has lost its amorphous structure and is no longer amorphous”, visible in particular also in an identifiable change in volume. If this structural effect or change in volume are thus identified, this represents, in a similar fashion to a predetermined breaking point, a protection or possibly exclusion criterion for future uses of the machine tool component.

It is therefore particularly expedient if the machine tool component is a tool holder, in particular a shrink-fit chuck or a (hydraulic) expansion chuck or a (tool) clamping system/device, a tool mandrel or a (zero-point) clamping system, or a tool, in particular a milling tool or rotating tool or a drill, or a (machine tool) spindle, or a different machine tool component such as a clamping device/system, a (reducing) bush, a tool carrier head, a cutter head, an (indexable) insert seat, an (indexable) insert, an indexable insert carrier, a hydraulic expansion bush, or an adapter, because the exceptional properties of amorphous metals are particularly relevant here.

In particular also in the case of clamping systems, such as tool clamping devices, where the component generates the clamping force of the latter itself, such as for example a shrink-fit chuck, and not just by exerting an external clamping force on the component by an element generating a clamping force, such as, for example, by a functional element which creates a conical seat for the component, the amorphous metal proves to be surprisingly expedient for such a “self-clamping” clamping system or for such a “self-clamping” tool clamping device. Because, although the elasticity which is otherwise to be associated with the amorphous metal may here have a counterproductive effect (could counteract the “self-clamping” function of the clamping system/clamping device), it has surprisingly and unexpectedly been shown that there is a secondary and harmless influence on this effect, in particular also in the case of or together with a corresponding geometric design of the component such as, for example, a larger clamping region and/or (relatively large) oversizing.

Alloys with a main constituent in proportions (by weight) of 50% to 90%, very particularly 75% to 80% or 55% to 60%, have proved to be expedient in the case of the machine tool component.

In particular zirconium-, copper-, iron-, and/or titanium-based (metal) alloys can be used in the case of the machine tool component and the method, in particular those with a main constituent in proportions (by weight) of 50% to 90%, very particularly 75% to 80% or 55% to 60%.

In particular zirconium-based alloys, in particular those with proportions of zirconium (by weight) of 50% to 90%, very particularly 75% to 80% or 55% to 60%, are expedient and here allow the described good properties which are particularly suitable for tool components to be achieved.

Further constituents of such zirconium-based alloys can be copper, aluminum, nickel, titanium, and/or niobium, in particular those with respective proportions (by weight) of 1% to 35%, very particularly 2% to 20%.

The same also applies for the envisageable copper-, iron-, and/or titanium-based (metal) alloys with main and secondary constituents which can provide the proportions (by weight) mentioned (for the zirconium-based alloys).

Although specific amorphous metals may in some circumstances also have low electrical and/or magnetic conductivity, which could be suboptimal in the case of known shrink-fit chucks to be treated inductively and in the case of insertion into and removal from the shrink-fit chuck, it may here be particularly expedient in the case of the method, i.e. here in the case of 3D printing, to imprint electrically and/or magnetically conductive (conductivity-increasing) “islands” (inclusions) using 3D printing. They can ensure that the tool holder increases its electrical and/or magnetic conductivity without the other exceptional properties of the amorphous machine tool components being lost. These islands (inclusions) can be generated by incorporating different substances and/or by forming regions with a different structure (for example, a lattice structure).

In a development, in particular in the case of the method, it can also be provided to “add on”, for example by means of 3D printing, the amorphous machine tool component to a conventionally manufactured, for example cast, machine tool component base body. An additively manufactured tool-side holding region (chuck region) can, for example, be added on in the case of a tool holder to a conventionally cast spindle-side interface (for example, HSK, inter alia) of the tool holder.

The same can thus also be provided in the case of the tool, for example with a conventional shank part and an amorphous processing part.

The same can likewise be provided in the case of conventionally manufactured base bodies, i.e. for example cores, which can be “overprinted” and/or “overmolded” (or correspondingly “coated”) with the amorphous machine tool component.

The above description of advantageous embodiments of the invention contains numerous features which are reproduced in the individual dependent claims, in some cases combined in multiples. These features can, however, also expediently be considered individually and combined in meaningful further combinations.

Although some terms are used respectively in the description or in the patent claims in the singular or in conjunction with a numeral, the scope of the invention for these terms is not to be restricted to the singular or the respective numeral. Furthermore, the words “a” and “an” are not to be understood as numerals, but rather as indefinite articles.

The above-described properties, features, and advantages of the invention and the manner in which these are achieved become more clearly and readily understandable in conjunction with the following description of the exemplary embodiments of the invention, which are explained in detail in conjunction with the drawings/FIGURES (the same parts/components and functions have the same reference numerals in the drawings/FIGURES).

The exemplary embodiments serve to explain the invention and do not limit the invention to combinations of features stated therein, and also not with respect to functional features. Moreover, features, suitable thereto, of each exemplary embodiment can also be considered explicitly in isolation, extracted from an exemplary embodiment, introduced in another exemplary embodiment in order to expand the latter, and/or combined with any of the claims.

Other features which are considered as characteristic for the invention are set forth in the appended claims.

Although the invention is illustrated and described herein as embodied in a machine tool component and a method for producing such a machine tool component, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURE

The single FIGURE of the drawing is a diagrammatic, perspective view of a machine tool having a spindle and a tool holder with a tool made of an amorphous metal according to the invention.

DETAILED DESCRIPTION OF THE INVENTION

Referring now to the single FIGURE of the drawing in detail, there is shown is shown a portion of a machine tool 10, in this case a milling machine 10, in the case of blisk machining.

As shown in the FIGURE, the milling machine 10 provides a spindle 8 (only a portion of which is visible), a tool holder 4, in this case a shrink-fit chuck 4, and a tool 6, in this case a cutter 6.

A particular feature of the milling machine 10 is that its components, in this case the spindle 8, the shrink-fit chuck 4, and the cutter 6, consist of amorphous metal (whereas these components otherwise do not differ from their known and usual structure and form).

The components have here been manufactured from a zirconium-based alloy with a proportion (by weight) of zirconium of 74% and further proportions (by weight) of copper (17%), aluminum (3%), nickel (2%), titanium (2%), and niobium (2%).

Whereas the spindle 8 and the cutter 6 have been injection-molded, the shrink-fit chuck 4 has been produced by 3D printing.

Although the invention has been illustrated and described in detail by the preferred exemplary embodiments, the invention is not limited by the disclosed examples and other variants can be derived therefrom without going beyond the protective scope of the invention.

The following is a summary list of reference numerals and the corresponding structure used in the above description of the invention:

2 machine tool component
4 tool holder, shrink-fit chuck
6 tool, cutter
8 spindle
10 machine tool, milling machine

The invention claimed is:

1. A machine tool component for a machine tool, comprising:

a machine tool component part including a spindle interface at one side configured to receive a spindle of the machine tool and interchangeably connect the machine tool component to the spindle of the machine tool, said machine tool component part including a tool holder at a side of the machine tool component part opposite to the one side; and said machine tool component part formed at least partially of an amorphous metal, wherein said machine tool component part is a tool holder, a shrink-fit chuck, a hydraulic expansion chuck, a tool clamping system, a tool mandrel, a zero-point clamping system, or a hydraulic expansion bush.

2. The machine tool component according to claim 1, wherein said amorphous metal of said machine tool component part is a zirconium alloy, a copper alloy, an iron alloy, and/or a titanium alloy.

3. The machine tool component according to claim 2, wherein said amorphous metal of said machine tool component part has at least one further alloy constituent selected from the group consisting of copper, aluminum, nickel, titanium, and niobium.

4. The machine tool component according to claim 3, wherein said at least one further alloy constituent has respective proportions by weight of 1% to 35%.

5. The machine tool component according to claim 1, wherein said amorphous metal has a main constituent with proportions by weight of 50% to 90%.

6. The machine tool component according to claim 1, further comprising a further machine component part formed from a non-amorphous metal.

7. The machine tool component according to claim 6, wherein said non-amorphous further machine component part is selected from the group consisting of a metallic core, a non-metallic core, a metallic add-on and a non-metallic add-on.

8. The machine tool component according to claim 1, wherein said machine tool component part is essentially or completely formed from said amorphous metal.

9. The machine tool component according to claim 1, wherein said amorphous metal has a main constituent with proportions by weight of 75% to 80%.

10. The machine tool component according to claim 1, wherein said amorphous metal has a main constituent with proportions by weight of 55% to 60%.

11. The machine tool component according to claim 1, wherein said amorphous metal of said machine tool component part has at least one alloy constituent selected from the group consisting of copper, aluminum, nickel, titanium, and niobium.

12. The machine tool component according to claim 1, wherein said machine tool component part formed at least partially of an amorphous metal is formed to include at least one of:

an island or inclusion made of a different material than the amorphous metal and/or present in the finished machine tool component part in a different structure than the amorphous metal; or a complex internal structure or shape formed in the amorphous metal of the machine tool component part.

13. The machine tool component according to claim 12, wherein said machine tool component part includes a complex internal structure formed as a complex internal duct system in the amorphous metal.

14. A method for producing a machine tool component for a machine tool, which comprises the step of:

forming a machine tool component part at least partially from an amorphous metal; and producing the machine tool component part using injection molding, additive manufacturing, or plastic deformation, the machine tool component part including a spindle interface at one side configured to receive a spindle of the machine tool and interchangeably connect the machine tool component to the spindle of the machine tool, said machine tool component part including a tool holder at a side of the machine tool component part opposite to the one side.

15. The method according to claim 14, which further comprises employing a casting and/or machining step in a production of the machine tool component part.

16. The method according to claim 14, which further comprises performing post-processing on the machine tool component part.

17. The method according to claim 14, wherein during the additive manufacturing or the injection molding and/or the plastic deformation, islands or inclusions, which are made of a different material than the amorphous metal and/or are present in a finished machine tool component part in a different structure, namely in an ordered lattice structure, are imprinted and/or injected and/or shaped therein and/or generated by heat treatment.

* * * * *